US012019579B2

(12) United States Patent
Wang (10) Patent No.: US 12,019,579 B2
(45) Date of Patent: Jun. 25, 2024

(54) DATA TRANSMISSION METHOD, APPARATUS, AND DEVICE, AND STORAGE MEDIUM (71) Applicant: Inspur Suzhou Intelligent Technology Co., Ltd., Suzhou (CN)

(72) Inventor: Jun Wang, Suzhou (CN)

(73) Assignee: Inspur Suzhou Intelligent Technology Co., Ltd., Suzhou (CN)

( * ) Notice: Subject to any disclaimer, the term of this patent is extended or adjusted under 35 U.S.C. 154(b) by 58 days.

(21) Appl. No.: 17/781,330

(22) PCT Filed: Apr. 27, 2020

(86) PCT No.: PCT/CN2020/087159
§ 371 (c)(1),
(2) Date: May 31, 2022

(87) PCT Pub. No.: WO2021/109432
PCT Pub. Date: Jun. 10, 2021

(65) Prior Publication Data
US 2023/0004518 A1    Jan. 5, 2023

(30) Foreign Application Priority Data

Dec. 6, 2019  (CN) .......................... 201911244749.X (51) Int. Cl.
*G06F 13/42*    (2006.01)
(52) U.S. Cl.
CPC .. *G06F 13/4282* (2013.01); *G06F 2213/0028* (2013.01)
(58) Field of Classification Search
None
See application file for complete search history.

(56) References Cited

U.S. PATENT DOCUMENTS 6,072,804 A  *  6/2000  Beyers, Jr. ............ H04J 3/0602
                                                      370/461
6,829,657 B1 * 12/2004  Lynn ..................... G06F 3/0605
                                                      710/16
(Continued)

FOREIGN PATENT DOCUMENTS

CN        105389123 A     3/2016
CN        105681359 A     6/2016
(Continued)

OTHER PUBLICATIONS

Search Report and Written Opinion, PCT/CN2020/087159, Sep. 9, 2020.

*Primary Examiner* — Henry Tsai
*Assistant Examiner* — Dean Phan
(74) *Attorney, Agent, or Firm* — David R. Stevens; Stevens Law Group (57) ABSTRACT A data transmission method, apparatus, and device and a storage medium. A control instruction sent by a first node main program is received and analyzed; when the control instruction is analyzed to be a first control instruction for controlling a first node, a value is assigned to a first variable of the first node; the first control instruction is executed to obtain first result data and fed back same to the first node main program; the first variable of the first node is sent to a second node SES program, so that the second node SES program receives and analyzes same, and assigns a value to a second variable of a second node. According to the method, in a multi-controller data processing situation, node data transmission is increased, redundant link control of a two-node SES program by one node is implemented, and an information interaction redundancy mechanism can be enhanced.

12 Claims, 5 Drawing Sheets (56) References Cited

U.S. PATENT DOCUMENTS

| | | | |
|---|---|---|---|
| 2003/0140099 A1* | 7/2003 | Beer | H04L 12/42 709/203 |
| 2012/0059991 A1* | 3/2012 | Cuddihy | G06F 3/0605 711/E12.001 |
| 2015/0149684 A1 | 5/2015 | Dhandapani | |

FOREIGN PATENT DOCUMENTS

| | | |
|---|---|---|
| CN | 106407081 A | 2/2017 |
| CN | 107544889 A | 1/2018 |
| CN | 107992372 A | 5/2018 |

* cited by examiner

DATA TRANSMISSION METHOD, APPARATUS, AND DEVICE, AND STORAGE MEDIUM

The present application claims the priority of Chinese patent application No. 201911244749.X, filed with the Chinese Patent Office on Dec. 6, 2019 and entitled "Data Transmission Method, Apparatus, Device, and Storage Medium", the contents of which are incorporated herein by reference in its entirety.

TECHNICAL FIELD

The present application relates to the technical field of storage, in particular to a data transmission method, apparatus, device, and a storage medium.

BACKGROUND

As to a storage system interface, the CPU handles with business data and has an external PICE interface; the hard disk is a common SAS interface, so a PICE may be converted to an SAS interface, and an SAS expander is connected to each hard disk. As to software applications, an enclosure management module is available to detect the operation of the device in real time, including temperature, voltage, fans, etc. In order to ensure that the device may operate stably and reliably for a long time, the information of the peripheral hardware needs to be detected in real time. The enclosure management module is divided into two parts: an SCSI Enclosure Service (SES) program running on an SAS expander and an enclosure management (EM) thread in a main program.

Figure 1:
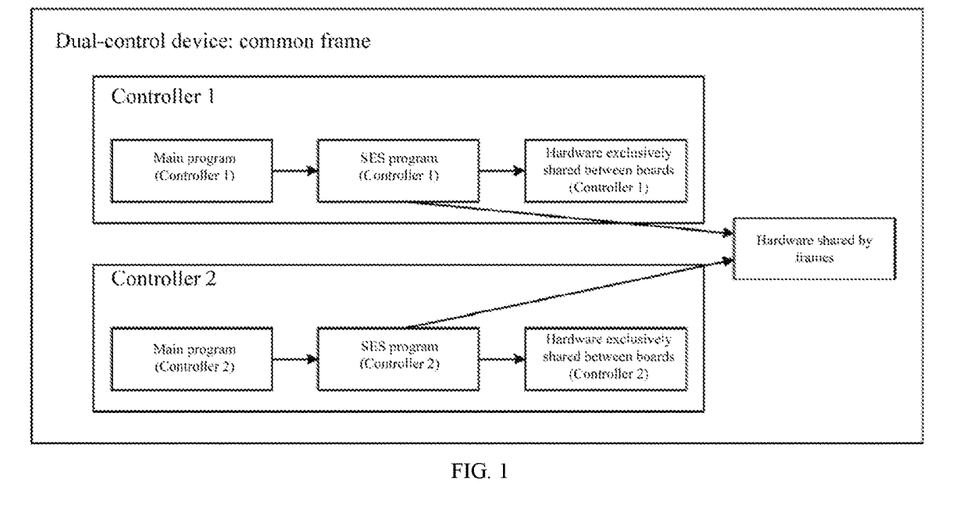
FIG. 1 shows a structural schematic diagram of an existing dual-control device.

In order to improve the high reliability and high performance of storage devices, multiple controllers are available in a set of devices to establish clusters to process data services in a unified manner; as shown in FIG. 1, a common dual-control device consists of two controllers, and the controllers have hardware that each SES program may control independently. The two controllers are assembled in a device frame, and the frame is provided with hardware shared by the frames, such as hard disk control lights, system lights, VPD information with consistent dual control, etc. However, two sets of SES programs will introduce some problems. For example, simultaneous control of hardware that may be controlled by dual control will be abnormal. There are also problems in the interaction between two SES programs. When one of the SES programs is abnormal, how to handle with the abnormity is also a problem.

Therefore, how to solve the above problem and achieve controllable control of the reliability of the enclosure management and the acquisition of the integrity information is a technical problem to be urgently solved by a person skilled in the art.

SUMMARY

In view of the above problem, the present application provides a data transmission method, apparatus, and device and a storage medium to overcome the above problem or at least partially overcome the above problem.

A data transmission method is provided, comprising:
receiving and analyzing a control instruction sent by a first node main program;
assigning a value to a first variable of a first node when the control instruction is analyzed to be a first control instruction for controlling the first node;
executing the first control instruction, to obtain first result data and send back the first result data to the first node main program; and
sending the first variable of the first node to a second node SES program, so as to allow the second node SES program to receive and analyze the same, and assign a value to a second variable of a second node.

Optionally, in the above data transmission method provided in the embodiment of the present application, after receiving and analyzing a control instruction sent by a first node main program, the method further includes:
assigning a value to a second variable of the first node when the control instruction is analyzed to be a second control instruction for controlling a second node;
sending the second variable of the first node to the second node SES program, so as to allow the second node SES program to receive and analyze the same, and assign a value to the first variable of the second node, and executes the second control instruction to obtain second result data; and
receiving the second result data and sending back to the first node main program.

Optionally, the above data transmission method provided in the embodiment of the present application further includes:
obtaining a query instruction; and
reporting data of the first node and the second node.

Optionally, in the above data transmission method provided in the embodiment of the present application, before receiving and analyzing the control instruction sent by the first node main program or before obtaining a query instruction, the method further includes: sending the initialized first variable of the first node to a second node receiving function through a first node sending function, so as to allow the second node receiving function to receive and analyze the same, and assign a value to the initialized second variable of the second node, and send the initialized second variable to the second node SES program.

Optionally, in the above data transmission method provided in the embodiment of the present application, before receiving and analyzing the control instruction sent by the first node main program or before obtaining a query instruction, the method further includes: sending the initialized second variable of the first node to a second node receiving function through a first node sending function, so as to allow the second node receiving function to receive and analyze the same, and assign a value to the initialized first variable of the second node, and send the initialized first variable to the second node SES program.

Optionally, the above data transmission method provided in the embodiment of the present application further includes:
performing real-time detection on the first variable of the first node through a first node detection function, if the first variable of the first node is detected to be changed, sending the changed first variable to the second node receiving function through the first node sending function, so as to allow the second node receiving function to receive and analyze the same, and assign a value to the second variable of the second node, and send the second variable to the second node SES program.

Optionally, the above data transmission method provided in the embodiment of the present application further includes:
performing real-time detection on the second variable of the first node through a first node detection function, and if the second variable of the first node is detected to be changed, sending the changed second variable to a second node receiving function through the first node sending function, so as to allow the second node receiving function to receive and analyze the same, and assign a value to the first variable of the second node, and send the first variable to the second node SES program.

Embodiments of the present application further provide a data transmission apparatus, including:
an instruction analyzing module, configured to receive and analyze a control instruction sent by the first node main program;
a variable assignment module, configured to assign a value to the first variable of the first node when analyzing that the control instruction is a first control instruction for controlling the first node;
a variable sending module, configured to send the first variable of the first node to the second node SES program, so as to allow the second node SES program to receive and analyze the same, and assign a value to the second variable of the second node; and
a result feedback module, configured to execute the first control instruction, to obtain first result data and send back to the first node main program.

Optionally, in the above data transmission apparatus provided in the embodiment of the present application, the instruction analyzing module is further configured to assign a value to the second variable of the first node when analyzing that the control instruction is the second control instruction for controlling the second node;
the variable sending module is further configured to send the second variable of the first node to the second node SES program, so as to allow the second node SES program to receive and analyze the same, and assign a value to the first variable of the second node, and executes the second control instruction to obtain second result data; and
the result feedback module is further configured to receive the second result data and send back to the first node main program.

Optionally, the above data transmission apparatus provided in the embodiment of the present application further includes:
an instruction obtaining module, configured to obtain a query instruction; and
a data reporting module, configured to report data of the first node and the second node.

Optionally, in the above data transmission apparatus provided in the embodiment of the present application, the variable sending module is further configured to send the initialized first variable of the first node to a second node receiving function through a first node sending function, so as to allow the second node receiving function to receive and analyze the same, and assign a value to a second variable of the second node, and send the second variable to the second node SES program.

Optionally, in the above data transmission apparatus provided in the embodiment of the present application, the variable sending module is further configured to send the initialized second variable of the first node to the second node receiving function through the first node sending function, so as to allow the second node receiving function to receive and analyze the same, and assign a value to an initialized first variable of the second node, and send the initialized first variable to the second node SES program.

Optionally, the above data transmission apparatus provided in the embodiment of the present application further includes:
a variable detection module, configured to perform real-time detection on the first variable of the first node through a first node detection function; and
the variable sending module is further configured to send the changed first variable to the second node receiving function through the first node sending function if the first variable of the first node is detected to be changed, so as to allow the second node receiving function to receive and analyze the same, and assign a value to the second variable of the second node, and send the second variable to the second node SES program.

Optionally, in the above data transmission apparatus provided in the embodiment of the present application, the variable detection module is further configured to perform real-time detection on the second variable of the first node through a first node detection function; and
the variable sending module is further configured to send the changed second variable to the second node receiving function through the first node sending function if the second variable of the first node is detected to be changed, so as to allow the second node receiving function to receive and analyze the same, and assign a value to the first variable of the second node, and send the first variable to the second node SES program.

Embodiments of the present application further provide a data transmission device, including a processor and a memory, wherein the processor implements, when executing the computer programs stored in the memory, the above data transmission method provided in the embodiments of the present application.

Embodiments of the present application further provide a computer-readable storage medium configured to store a computer program, wherein the computer program implements, when being executed by the processor, the above data transmission method provided in the embodiments of the present application.

By means of the above technical solution, the present application provides a data transmission method, apparatus and device and a storage medium, the method includes: receiving and analyzing a control instruction sent by a first node main program; assigning a value to a first variable of a first node when the control instruction is analyzed to be a first control instruction for controlling the first node; executing the first control instruction, to obtain first result data and send back the first result data to the first node main program; and sending the first variable of the first node to a second node SES program, so as to allow the second node SES program to receive and analyze the same, and assign a value to a second variable of a second node.

In the present application, in a multi-controller data processing situation, a node main program may send a control instruction of this node to this node SES program to obtain feedback data, and send the variables to the opposite terminal for backup at the same time, node data transmission is increased, redundant link control of a two-node SES program by one node is implemented by means of two-node interaction, and an information interaction redundancy mechanism may be enhanced to ensure that the redundancy may be controlled normally under normal and abnormal conditions of a device, to achieve controllable control of the reliability of the enclosure management and the acquisition of the integrity information.

The above description is only an overview of the technical solution of the present application, which may be implemented according to the contents of the specification for a clearer understanding of the technical means of the present application, and in order to make the above and other objects, characteristics and advantages of the present application more obvious and understandable, the following are specific embodiments of the present application.

BRIEF DESCRIPTION OF THE DRAWINGS

Various other advantages and beneficial effects will become apparent to a person skilled in the art by reading the detailed description of the preferred embodiment below. The accompanying drawings are merely used for illustrating the preferred embodiments only and are not considered to be a limitation of the present application. Moreover, throughout the accompanying drawings, the same reference numerals are used to indicate the same components. In the accompanying drawings.

DETAILED DESCRIPTION

Currently, each node in the dual-control node has a main program and an SES program; the main program interacts with the SES program to obtain enclosure management information; when the devices are operating normally, each may operate independently and interact independently; however, many devices need to determine comprehensively after information at both ends is obtained, and independent issuing and control are inconvenient. Therefore, in consideration of establishing a channel by means of dual-control to increase the transmission of dual-control information, the main program may conveniently obtain the information of two nodes and facilitate timely processing based on the integrated information of dual control. When a failure occurs, a certain main program or a link is unstable and may not interact normally, and the single-node program may collect the enclosure information of the dual control, which may facilitate the location problem.

In view of the above problems existing now, based on the establishment of interaction channels between SES programs, the present application provides a data transmission method that enhances the information interaction redundant mechanism and ensures normal control of redundancy in both normal and abnormal conditions of the device.

To facilitate understanding, a clear and complete description will be given below on the technical solutions in the embodiments of the present application in combination with accompanying drawings in the embodiments of the present application. Apparently, the described embodiments are merely a part but not all of the embodiments of the present application. Based on the embodiments in the present application, all the other embodiments obtained by a person skilled in the art without any creative effort shall all fall within the protection scope of the present application.

Figure 2:
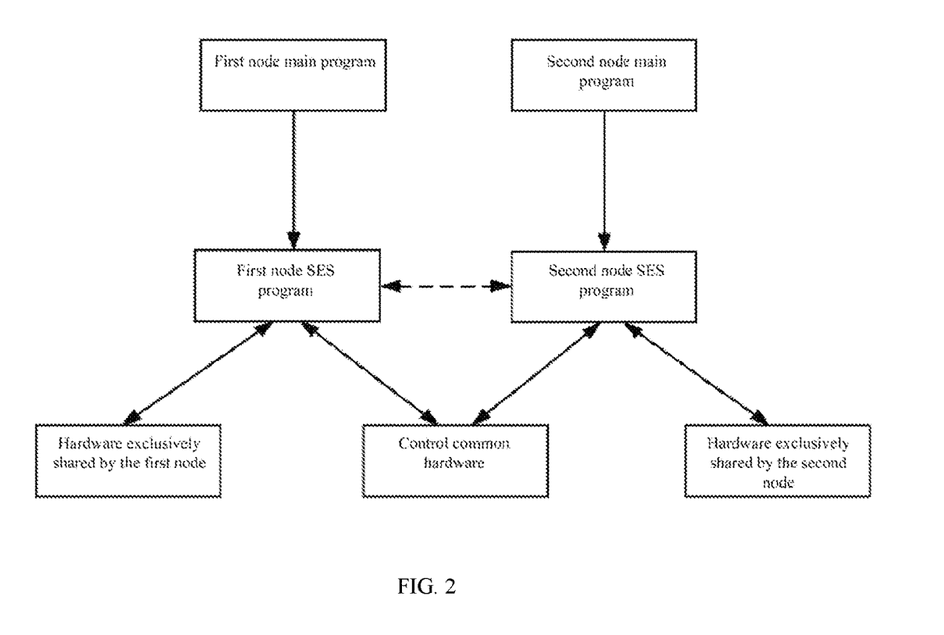
FIG. 2 shows a diagram of layout of two-node program provided in the embodiments of the present application.

For the convenience of description, one of the subsequent dual-control nodes is defined as a first node and the other node is defined as a second node. FIG. 2 shows a schematic diagram of the layout of two-node programs, and the first node and the second node have their own main program and SES program; and the SES program will control the hardware and interact with the main program for various data.

A variable set for interaction between two-node SES programs is defined as a first variable and a second variable respectively, an enumeration type is added, and each variable has an identification enumeration ID. It should be noted that, in addition to the interaction variables between the main program and the SES program, in order to expand the application, the variable set may also contain important data in each function module; and the data may be added flexibly and freely.

Figure 3:
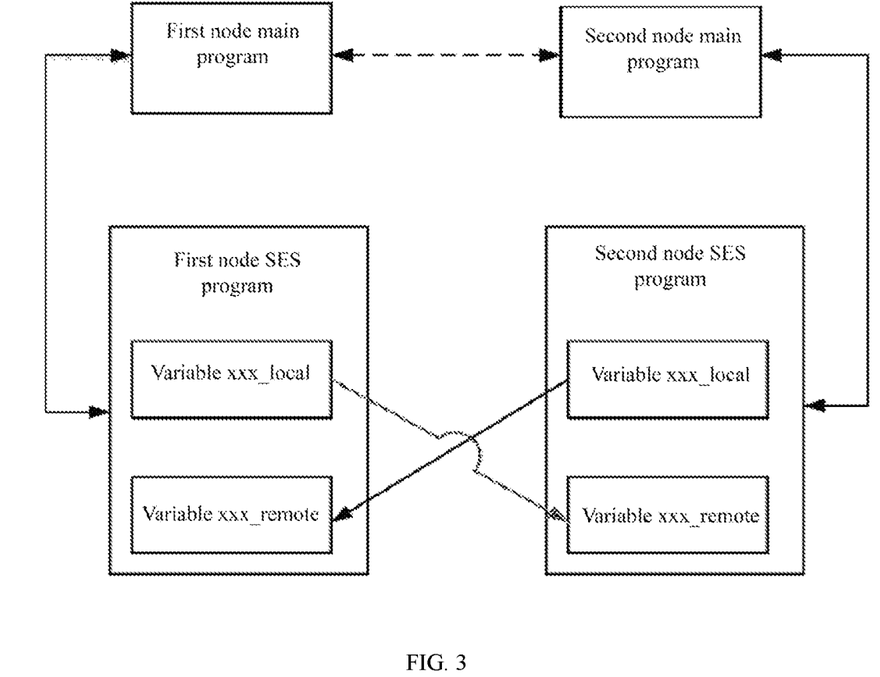
FIG. 3 shows a schematic diagram of a data transmission mechanism provided in the embodiments of the present application.

As shown in FIG. 3, the name of the first variable is defined as a variable xxx_local to store the data of this node, and the name of the second variable is defined as a variable xxx_remote to receive and store the data of node on the opposite terminal. Specifically, the variable xxx_local in the first node SES program is used to store the data of the first node and the variable xxx_remote is used to receive and store the data of the second node; the variable xxx_local in the second node SES program is used to store the data of the second node and the variable xxx_remote is used to receive and store the data of the first node. During specific implementation, the transmission of data of the first node and the second node is bidirectional. When being controlled by the main program, the variables may be assigned in a reverse direction. There are different application scenarios aiming at data with different functions.

Figure 4:
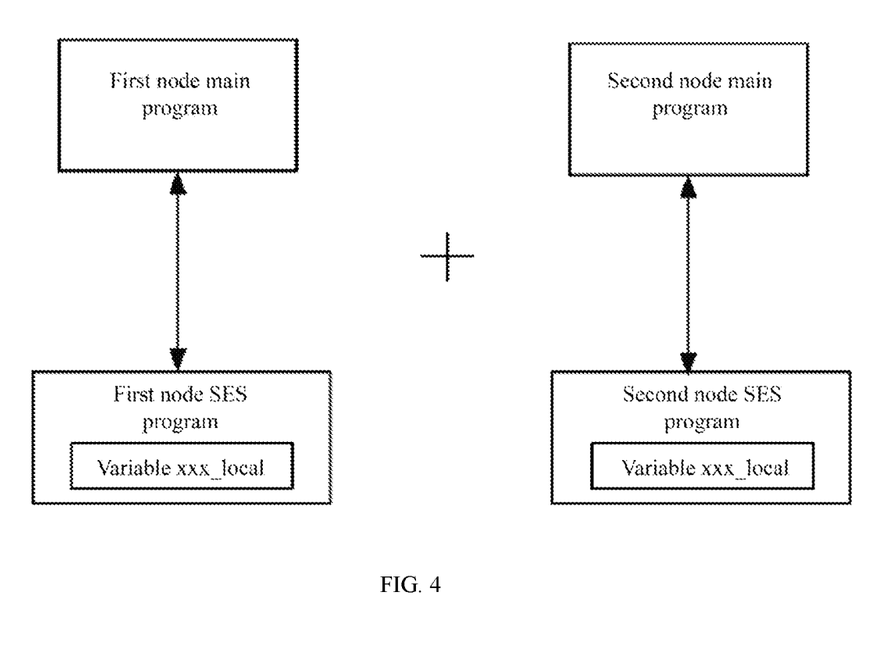
FIG. 4 shows a first schematic diagram of redundant link control provided in the embodiments of the present application.

As shown in FIG. 4, the main program may achieve independent control of this node SES program, i.e., the first node main program may control the first node SES program independently, and the second node main program may control the second node SES program independently, and interact using the variable xxx_local. This process may occur when the interaction link is normal, or when the main program or the interaction link is abnormal.

Figure 5:
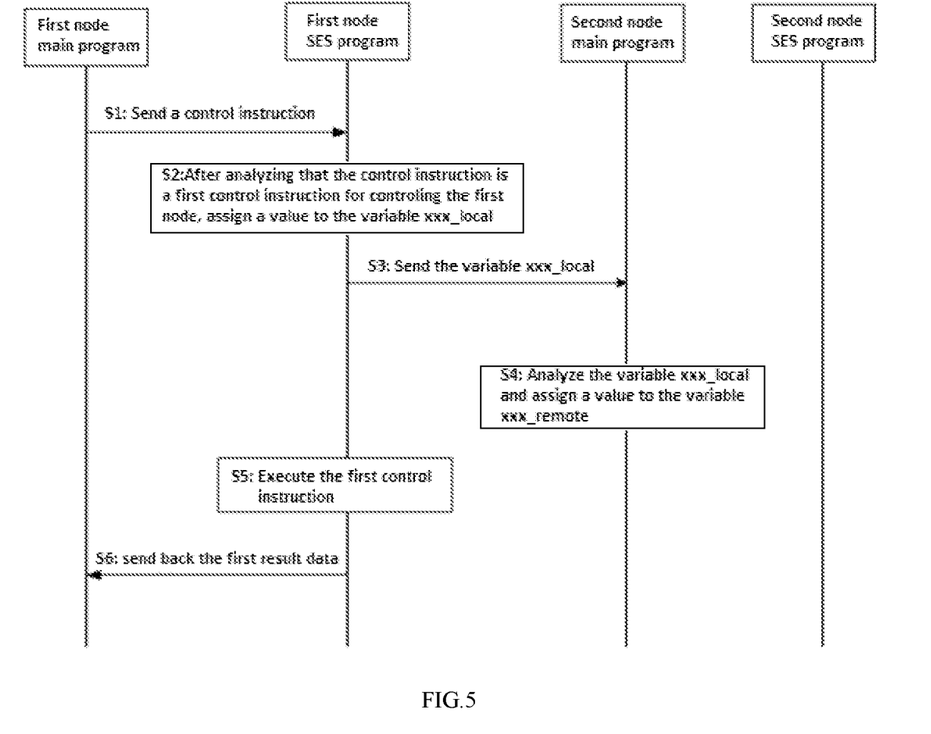
FIG. 5 shows a first signaling interaction diagram of a data transmission method provided in the embodiments of the present application.

During specific implementation, as shown in FIG. 5, the data transmission method provided in the present application includes the following steps:

S1, the first node main program sends a control instruction to the first node SES program;

S2, after analyzing that the control instruction is a first control instruction for controlling the first node, the first node SES program assigns a value to the variable xxx_local of the first node;

S3, the first node SES program sends the variable xxx_local of the first node to the second node SES program;

S4, the second node SES program analyzes the variable xxx_local of the first node and assigns a value to the variable xxx_remote of the second node and saves the same;

S5, the first node SES program executes the first control instruction, to obtain the first result data; and S6, the first node SES program feeds back the first result data to the first node main program.

In the above data transmission method provided by the embodiments of the present application, on establishing an interaction channel between SES programs, through the above steps S1 to S6, a node main program may send a control instruction of this node to this node SES program to obtain feedback data, and send the variables to the opposite terminal for backup at the same time, node data transmission is increased, redundant link control of a two-node SES program by one node is implemented by means of two-node interaction, thereby enhancing interaction redundancy between the main program and the SES program.

It should be noted that, when the main program of a node needs to send a control instruction to the SES program, whether the operation state and link state of the main program of the opposite terminal are healthy is first checked; when the node on the opposite terminal is healthy, each node is controlled independently, and the main program only sends control instructions of this node to the SES program and obtains feedback data from this node SES program; when the node on the opposite terminal is not healthy, the first node main program may send the first control instruction aiming at the first node to the first node SES program, and may also send second control instruction aiming at the second node to the first node SES program.

Figure 6:
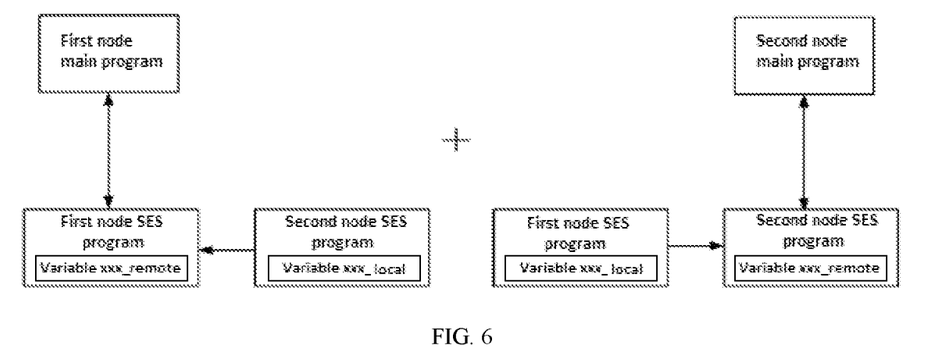
FIG. 6 shows a second schematic diagram of redundant link control provided in the embodiments of the present application.

As shown in FIG. 6, when the node on the opposite terminal is unhealthy (when the main program or interaction link is abnormal), in the left figure, the first node main program may send a second control instruction for controlling the second node to the first node SES program, and the first node SES program to receive and analyze the variable xxx_remote of the first node and transmits to the variable xxx_local of the second node. The second node SES program executes the instruction and sends the feedback data to the first node SES program, the first node SES program then feeds back to the main program. The right figure is the same as the left figure, such that the SES program of both nodes may still be controlled when the main program or the link is abnormal, thereby further enhancing the redundancy of the interaction between the main program and the SES program.

Figure 7:
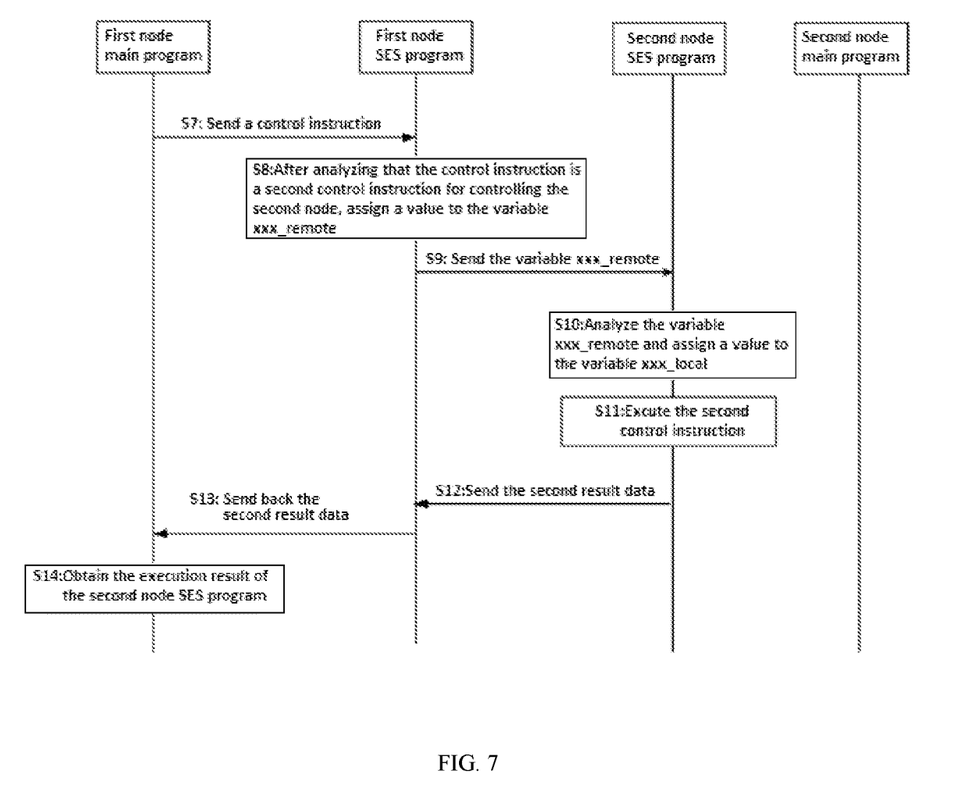
FIG. 7 shows a second signaling interaction diagram of a data transmission method provided in the embodiments of the present application.

According to the above description, during specific implementation, as shown in FIG. 7, the above data transmission method provided in the embodiments of the present application further includes the following steps:

S7, the first node main program sends a control instruction to the first node SES program;

S8, after analyzing that the control instruction is a second control instruction for controlling the second node, the first node SES program assigns a value to the variable xxx_remote of the first node;

S9, the first node SES program sends the variable xxx_remote of the first node to the second node SES program;

S10, the second node SES program analyzes the variable xxx_remote of the first node and assigns a value to the variable xxx_local of the second node;

S11, the second node SES program executes the second control instruction, to obtain the second result data;

S12, the second node SES main program sends the second result data to the first node SES program;

S13, the first node SES program feeds back the second result data to the first node main program; and S14, the first node main program obtains the execution result of the second node SES program.

In this way, through the above steps S7 to S14, the node main program may send the control instruction of the node on the opposite terminal to this node SES program, and use the interaction channel to complete the instruction and data result between the two-node SES programs.

It may be concluded from steps S1 to S14 that the main program may achieve the control instructions for the SES programs of this node and the node on the opposite terminal; specifically, when receiving the instruction sent by the main program for controlling this node, a value is assigned to the variable xxx_local of this node; when receiving the instruction sent by the main program to control the node on the opposite terminal, a value is assigned to the variable xxx_remote of this node, and sent to the node on the opposite terminal, and the node on the opposite terminal assigns a value to the variable xxx_local of the node on the opposite terminal.

In practical applications, on the basis of redundant link control, the control instruction of the node on the opposite terminal is sent, to expand the transmission application and to be used in scenarios such as firmware upgrade and log collection, which is convenient for locating fault state and taking abnormal repair measures, improving development efficiency and reducing maintenance costs.

Since the content of the interaction between the SES program and this node main program contains the two-node variable data, in order to increase the interaction content and enhance the redundancy of the interaction between the two-node SES programs based on the established interaction channel, during specific implementation, the above data transmission method provided in the embodiments of the present application further includes: the main program sends a query instruction to the SES program; the SES program may report the data of this node and the node on the opposite terminal. In other words, when interacting with the main program, the variable xxx_local and variable xxx_remote of each node may be uploaded at the same time, i.e., a node may send a query instruction to obtain both data of this terminal and the opposite terminal, therefore, the data of the SES programs at double terminals may be queried at one node and the control of the double terminals may be realized by issuing different control codes. When the master node is querying the enclosure information, each node may report the two-node information in time, thereby ensuring comprehensive and timely information transmission and reporting, and providing convenience for debugging and positioning.

Figure 8:
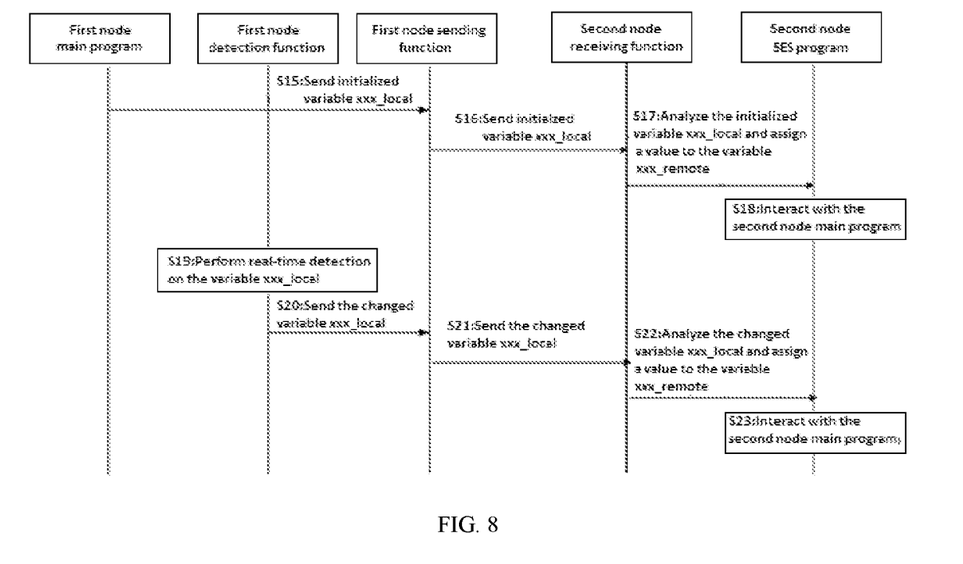
FIG. 8 is a third signaling interaction diagram of a data transmission method provided in the embodiments of the present application.

Further, during specific implementation, in the above data transmission method provided in the embodiments of the present application, before the first node main program sends a control instruction to the first node SES program, or, before the first node main program sends a query instruction to the first node SES program, the first node needs to initialize all the variables of the interaction set before the system starts, as shown in FIG. 8, then the following steps may be performed:

S15, the first node SES program sends the initialized variable xxx_local of the first node to the first node sending function;

S16, the first node sending function sends the initialized variable xxx_local of the first node to the second node receiving function;

S17, the second node receiving function analyzes the initialized variable xxx_local of the first node and assigns a value to the variable xxx_remote of the second node and sends the variable xxx_remote to the second node SES program;

S18, the second node SES program interacts with the second node main program.

Similarly, during specific implementation, in the above data transmission method provided in the embodiments of the present application, the following steps may further be performed:

Step 1, the first node SES program sends the initialized variable xxx_remote of the first node to the first node sending function;

Step 2, the first node sending function sends the initialized variable xxx_remote of the first node to the second node receiving function;

Step 3, the second node receiving function analyzes the initialized variable xxx_remote of the first node and assigns a value to the variable xxx_local of the second node and sends the variable xxx_local to the second node SES program; and Step 4, the second node SES program interacts with the second node main program.

Aiming at the change of the hardware state, when the change of the variable local of this terminal is read, the data should be updated and sent to the variable remote on the opposite terminal. In other words, when the state data of a node changes, it needs to be transmitted to the node on the opposite terminal for storage at the first time; and the timeliness of transmission depends on the establishment of a variable detection mechanism and a reliable transmission state machine. During specific implementation, in the above data transmission method provided in the embodiments of the present application, as shown in FIG. 8, the following steps may also be included:

S19, the variable xxx_local of the first node is detected in real time through the first node detection function;

S20, when detecting that the variable xxx_local of the first node is changed, the first node detection function sends the changed variable xxx_local to the first node sending function;

S21, the first node sending function sends the changed variable xxx_local to the second node receiving function;

S22, the second node receiving function receives and analyzes and assigns a value to the variable xxx_remote of the second node, and sends the variable xxx_remote to the second node SES program; and S23, the second node SES program interacts with the second node main program.

Similarly, when the change of the variable remote at this terminal is read, the data also needs to be updated in time and sent to the variable local on the opposite terminal. During specific implementation, in the above data transmission method provided in the embodiments of the present application, the following steps may also be included:

Step 1, the variable xxx_remote of the first node is detected in real time through the first node detection function;

Step 2, when detecting that the variable xxx_remote of the first node is changed, the first node detection function sends the changed variable xxx_remote to the first node sending function;

Step 3, the first node sending function sends the changed variable xxx_remote to the second node receiving function;

Step 4, the second node receiving function receives and analyzes and assigns a value to the variable xxx_local of the second node, and sends the variable xxx_local to the second node SES program; and Step 5, the second node SES program interacts with the second node main program.

In this way, the data backup of the other node is added to one node, i.e., more detailed information of one node is transmitted to the node on the opposite terminal, and each node may record the complete two-node information in details and the complete information is updated in time to achieve redundant data backup, which is convenient for reporting hardware state; the main program of each node can directly obtain the latest and complete detailed data of the enclosure, which is convenient for the main program to control the enclosure and improve the reliability query.

According to the above description, it may be understood that steps S3 and S4 may be specifically described as that the first node SES program sends the variable xxx_local of the first node to the first node sending function; the first node sending function sends the variable xxx_local of the first node to the second node receiving function, and the second node receiving function analyzes the variable xxx_local of the first node and assigns a value to the variable xxx_remote of the second node and sends the variable xxx_remote to the second node SES program; in other words, the first variable of the first node is sent to the SES program of the second node, so as to allow the second node SES program may receive and analyze the same, and assign a value to the second variable of the second node, which may be understood as sending the first variable of the first node to the second node receiving function through the first node sending function, so as to allow the second node receiving function may receive and analyze the same, and assign a value to the second variable of the second node, and send the second variable to the second node SES program.

Similarly, steps S9 and S10 may be specifically described as that the first node SES program sends the variable xxx_remote of the first node to the first node sending function; the first node sending function sends the variable xxx_remote of the first node to the second node receiving function, and the second node receiving function analyzes the variable xxx_remote of the first node and assigns a value to the variable xxx_local of the second node and sends the variable xxx_local to the second node SES program; that is, the second variable of the first node is sent to the second node SES program, so as to allow the second node SES program to receive and analyze the same, and assign a value to the first variable of the second node, which may be understood as sending the second variable of the first node to the second node receiving function through the first node sending function, so as to allow the second node receiving function receives and analyzes the same and assigns a value to the first variable of the second node, and sends the first variable to the second node SES program.

Based on the same inventive concept, embodiments of the application further provide a data transmission apparatus, and since the data transmission apparatus solves the problem in a way similar to the aforementioned data transmission method, for the implementation of the data transmission apparatus, please refer to the implementation of the data transmission method, and the repeated parts will not be repeated redundantly herein.

Figure 9:
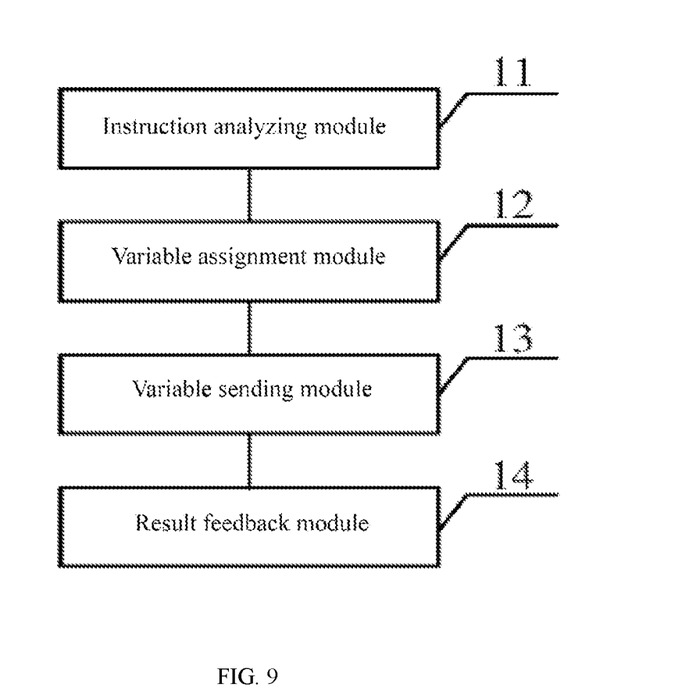
FIG. 9 shows a structural schematic diagram of a data transmission apparatus provided in the embodiments of the present application.

During specific implementation, as shown in FIG. 9, the data transmission apparatus provided in the embodiments of the present application specifically includes:

an instruction analyzing module 11, configured to receive and analyze a control instruction sent by the first node main program;

a variable assignment module 12, configured to assign a value to the variable xxx_local of the first node when analyzing that the control instruction is a first control instruction for controlling the first node;

a variable sending module 13, configured to send the variable xxx_local of the first node to the second node SES program, so as to allow the second node SES program to receive and analyze the same, and assign a value to the variable xxx_remote of the second node; and a result feedback module 14, configured to execute the first control instruction, to obtain first result data and send back to the first node main program.

In the above data transmission apparatus provided in the embodiments of the present application, the node data transmission may be increased by the interaction of the above four modules, redundant link control of a two-node SES program by one node is implemented by means of two-node interaction, and the information interaction redundant mechanism may be enhanced, thereby ensuring normal control of redundancy in both normal and abnormal conditions of the device.

Further, during specific implementation, in the above data transmission apparatus provided in the embodiments of the present application, the instruction analyzing module 11 is further configured to assign a value to the variable xxx_remote of the first node when analyzing that the control instruction is the second control instruction for controlling the second node;

the variable sending module 13 is further configured to send the variable xxx_remote of the first node to the second node SES program, so as to allow the second node SES program to receive and analyze the same, and assign a value to the variable xxx_local of the second node, and executes the second control instruction to obtain second result data; and the result feedback module 14 is further configured to receive the second result data and send back to the first node main program.

The SES program manages the state of each hardware. By means of redundant control channels, upper-layer functions such as enclosure query, firmware upgrade, and log collection may be extended, such that the enclosure is still controllable under abnormal conditions, thereby providing convenience to program debugging and fault positioning, improving development efficiency and reducing maintenance.

Further, during specific implementation, the above data transmission apparatus provided in the embodiments of the present application further includes: an instruction obtaining module, further configured to obtain a query instruction; and a data reporting module, configured to report data of the first node and the second node.

Further, during specific implementation, in the above data transmission apparatus provided in the embodiments of the present application, the variable sending module 13 is further configured to send the initialized variable xxx_local of the first node to a second node receiving function through a first node sending function, so as to allow the second node receiving function to receive and analyze the same, and assign a value to a variable xxx_remote of the second node, and send the variable xxx_remote to the second node SES program.

Similarly, during specific implementation, in the above data transmission apparatus provided in the embodiments of the present application, the variable sending module 13 is further configured to send the initialized variable xxx_remote of the first node to the second node receiving function through the first node sending function, so as to allow the second node receiving function to receive and analyze the same, and assign a value to a variable xxx_local of the second node, and send the variable xxx_local to the second node SES program.

Further, during specific implementation, the above data transmission apparatus provided in the embodiments of the present application further includes: a variable detection module, configured to perform real-time detection on the variable xxx_local of the first node through a first node detection function; and the variable sending module 13 is further configured to send the changed variable xxx_local to the second node receiving function through the first node sending function if the variable xxx_local of the first node is detected to be changed, so as to allow the second node receiving function to receive and analyze the same, and assign a value to the variable xxx_remote of the second node, and send the variable xxx_remote to the second node SES program.

Similarly, during specific implementation, in the above data transmission apparatus provided in the embodiments of the present application, the variable detection module is further configured to perform real-time detection on the variable xxx_remote of the first node through a first node detection function; and the variable sending module 13 is further configured to send the changed variable xxx_remote to the second node receiving function through the first node sending function if the variable xxx_remote of the first node is detected to be changed, so as to allow the second node receiving function to receive and analyze the same, and assign a value to the variable xxx_local of the second node, and send the variable xxx_local to the second node SES program.

For the more specific working process of each above module, please refer to the corresponding contents disclosed in the aforementioned embodiments, which will not be repeated redundantly herein.

Correspondingly, embodiments of the present application further disclose a data transmission device, including a processor and a memory, wherein the processor implements, when executing the computer programs stored in the memory, the data transmission method disclosed in the aforementioned embodiments.

For the more specific process of each above method, please refer to the corresponding contents disclosed in the aforementioned embodiments, which will not be repeated redundantly herein.

Further, the present application further discloses a computer-readable storage medium configured to store a computer program; and the computer program implements, when being executed by the processor, the data transmission method disclosed above.

For the more specific process of each above method, please refer to the corresponding contents disclosed in the aforementioned embodiments, which will not be repeated redundantly herein.

In the present specification, each embodiment is described in a progressive manner, and each embodiment focuses on the differences with other embodiments, and the same or similar parts between each embodiment may be referred to each other. For the apparatus, device, storage medium disclosed in the embodiment, since it corresponds to the method disclosed in the embodiment, the description is relatively simple, for the relevant parts, please refer to the description of the method section.

The professionals may further realize that the units and algorithmic steps of the examples described in combination with the embodiments disclosed herein may be implemented in electronic hardware, computer software, or a combination of the two, and that the components and steps of the examples have been described generally by function in the above description to clearly illustrate the interchangeability of hardware and software. Whether these functions are performed in hardware or software depends on the particular application and design constraints of the technical solution. A person skilled in the art may use different methods to implement the described functions for each particular application, but such implementation should not be considered to go beyond the scope of the present application.

The steps of the method or algorithm described in combination with the embodiments disclosed herein may be implemented directly with hardware, a software module executed by a processor, or a combination of the two. The software module may be placed in a random access memory (RAM), a memory, a read-only memory (ROM), an electrically programmable ROM, an electrically erasable programmable ROM, a register, a hard disk, a removable disk, a CD-ROM, or any other form of storage media known in the art.

Embodiments of the present application provide a data transmission method, apparatus and device and a storage medium, and the method includes: receiving and analyzing a control instruction sent by a first node main program; assigning a value to a first variable of a first node when the control instruction is analyzed to be a first control instruction for controlling the first node; executing the first control instruction, to obtain first result data and send back the first result data to the first node main program; and sending the first variable of the first node to a second node SES program, so as to allow the second node SES program to receive and analyze the same, and assign a value to a second variable of a second node. In this way, in a multi-controller data processing situation, the node data transmission is increased, redundant link control of a two-node SES program by one node is implemented by means of two-node interaction, and an information interaction redundancy mechanism may be enhanced to ensure that the redundancy may be controlled normally under normal and abnormal conditions of a device, to achieve controllable control of the reliability of the enclosure management and the acquisition of the integrity information.

It should also be noted that in the present specification, relationship terms such as first and second are merely used to distinguish one entity or operation from another entity or operation, and do not necessarily require or imply any such actual relationship or order between those entities or operations. Further, the terms "includes", "comprises" or any other variation thereof are intended to cover non-exclusive inclusion, such that a process, method, article, or device including a series of elements includes not only those elements, but also other elements not expressly listed, or elements that are inherent to such a process, method, article, or device. Without further limitation, the elements defined by the statement "including a . . . " do not preclude the existence of additional identical elements in the process, method, article, or device that include the elements.

The above is a detailed description of the data transmission method, apparatus, device and storage medium provided by the present application, and the principle and embodiments of the present application are described by applying specific examples in the text. The above description of the embodiments is merely for helping to understand the method of the present application and its core idea; at the same time, for a person skilled in the art, changes may be made in the specific embodiments and application scope according to the idea of the present application, and in summary, the content of this specification should not be understood as a limitation of the present application. Any modification, equivalent substitution, improvement and the like made within the spirit and principle of the present application shall all fall within the scope of the claims of the present application.

The invention claimed is:

1. A data transmission method, comprising:
receiving and analyzing a control instruction sent by a first node main program;
assigning a value to a first variable of a first node when the control instruction is analyzed to be a first control instruction for controlling the first node;
executing the first control instruction, to obtain first result data and send back the first result data to the first node main program;
sending the first variable of the first node to a second node SCSI Enclosure Service (SES) program, so as to allow the second node SES program to receive and analyze the same, and assign a value to a second variable of a second node;
assigning a value to a second variable of the first node when the control instruction is analyzed to be a second control instruction for controlling the second node;
sending the second variable of the first node to the second node SES program, so as to allow the second node SES program to receive and analyze the same, assign a value to the first variable of the second node, and execute the second control instruction to obtain second result data; and
receiving the second result data from the second node SES program, and sending back the second result data to the first node main program.

2. The data transmission method of claim 1, further comprising:
obtaining a query instruction; and
reporting data of the first node and the second node.

3. The data transmission method of claim 2, wherein before receiving and analyzing the control instruction sent by the first node main program or before obtaining a query instruction, the method further comprises:
sending the initialized first variable of the first node to a second node receiving function through a first node sending function, so as to allow the second node receiving function to receive and analyze the same, and assign a value to the initialized second variable of the second node, and send the initialized second variable to the second node SES program.

4. The data transmission method of claim 3, wherein before receiving and analyzing the control instruction sent by the first node main program or before obtaining a query instruction, the method further comprises:
sending the initialized second variable of the first node to a second node receiving function through a first node sending function, so as to allow the second node receiving function to receive and analyze the same, and assign a value to the initialized first variable of the second node, and send the second variable to the second node SES program.

5. The data transmission method of claim 4, further comprising:
performing real-time detection on the first variable of the first node through a first node detection function, if the first variable of the first node is detected to be changed, sending the changed first variable to the second node receiving function through the first node sending function, so as to allow the second node receiving function to receive and analyze the same, and assign a value to the second variable of the second node, and send the second variable to the second node SES program.

6. The data transmission method of claim 5, further comprising:
performing real-time detection on the second variable of the first node through a first node detection function; and
if the second variable of the first node is detected to be changed, sending the changed second variable to a second node receiving function through the first node sending function, so as to allow the second node receiving function to receive and analyze the same, and assign a value to the first variable of the second node, and send the first variable to the second node SES program.

7. A data transmission device, comprising a processor and a memory, wherein the processor implements, when executing the-a computer programs stored in the memory, the-a data transmission method comprising:
receiving and analyzing a control instruction sent by a first node main program;
assigning a value to a first variable of a first node when the control instruction is analyzed to be a first control instruction for controlling the first node;
executing the first control instruction, to obtain first result data and send back the first result data to the first node main program;
sending the first variable of the first node to a second node SES program, so as to allow the second node SES program to receive and analyze the same, and assign a value to a second variable of a second node;
assigning a value to a second variable of the first node when the control instruction is analyzed to be a second control instruction for controlling the second node;
sending the second variable of the first node to the second node SES program, so as to allow the second node SES program to receive and analyze the same, assign a value to the first variable of the second node, and execute the second control instruction to obtain second result data; and
receiving the second result data from the second node SES program, and sending back the second result data to the first node main program.

8. A non-transitory computer-readable storage medium, configured to store a computer program, wherein the computer program implements, when being executed by the processor, to perform the data transmission method of:
receiving and analyzing a control instruction sent by a first node main program; assigning a value to a first variable of a first node when the control instruction is analyzed to be a first control instruction for controlling the first node;
executing the first control instruction, to obtain first result data and send back the first result data to the first node main program;
sending the first variable of the first node to a second node SCSI Enclosure Service (SES) program, so as to allow the second node SES program to receive and analyze the same, and assign a value to a second variable of a second node;
assigning a value to a second variable of the first node when the control instruction is analyzed to be a second control instruction for controlling the second node;
sending the second variable of the first node to the second node SES program, so as to allow the second node SES program to receive and analyze the same, assign a value to the first variable of the second node, and execute the second control instruction to obtain second result data; and
receiving the second result data from the second node SES program, and sending back the second result data to the first node main program.

9. The data transmission device of claim 7, wherein, the method further comprises:
obtaining a query instruction; and
reporting data of the first node and the second node.

10. The data transmission device of claim 9, wherein before receiving and analyzing the control instruction sent by the first node main program or before obtaining a query instruction, the method further comprises:
sending the initialized first variable of the first node to a second node receiving function through a first node sending function, so as to allow the second node receiving function to receive and analyze the same, and assign a value to the initialized second variable of the second node, and send the initialized second variable to the second node SES program.

11. The data transmission device of claim 10, wherein before receiving and analyzing the control instruction sent by the first node main program or before obtaining a query instruction, the method further comprises:
sending the initialized second variable of the first node to a second node receiving function through a first node sending function, so as to allow the second node receiving function to receive and analyze the same, and assign a value to the initialized first variable of the second node, and send the second variable to the second node SES program.

12. The data transmission device of claim 11, wherein, the method further comprising:
performing real-time detection on the first variable of the first node through a first node detection function, if the first variable of the first node is detected to be changed, sending the changed first variable to the second node receiving function through the first node sending function, so as to allow the second node receiving function to receive and analyze the same, and assign a value to the second variable of the second node, and send the second variable to the second node SES program.

* * * * *